United States Patent
Haïdar et al.

(10) Patent No.: US 11,485,200 B2
(45) Date of Patent: Nov. 1, 2022

(54) FILTERING VIEWING ELEMENT FORMING A FRONT OR REAR WINDSHIELD OF A ROAD VEHICLE

(71) Applicant: OFFICE NATIONAL D'ETUDES ET DE RECHERCHES AÉROSPATIALES, Palaiseau (FR)

(72) Inventors: Riad Haïdar, Paris (FR); Sylvain Maine, Paris (FR); Gregory Vincent, Massy (FR); Jérôme Primot, Chatillon (FR); Hervé Lachaud, Le Plessis Robinson (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 680 days.

(21) Appl. No.: 16/334,633

(22) PCT Filed: Sep. 20, 2017

(86) PCT No.: PCT/FR2017/052523
§ 371 (c)(1),
(2) Date: Mar. 19, 2019

(87) PCT Pub. No.: WO2018/055290
PCT Pub. Date: Mar. 29, 2018

(65) Prior Publication Data
US 2021/0300160 A1 Sep. 30, 2021

(30) Foreign Application Priority Data
Sep. 20, 2016 (FR) ...................................... 16 01369

(51) Int. Cl.
*B60J 3/06* (2006.01)
*G02B 5/30* (2006.01)

(52) U.S. Cl.
CPC .............. *B60J 3/06* (2013.01); *G02B 5/3025* (2013.01)

(58) Field of Classification Search
CPC ..... B60J 3/06; B60J 3/00; B60J 3/0291; B60J 3/0295; B60J 3/007; G02B 5/3025;
(Continued)

(56) References Cited

U.S. PATENT DOCUMENTS

| 3,026,763 A | 3/1962 | Marks |
| 7,656,581 B2 * | 2/2010 | Giraudet ................ A42B 3/226 359/486.02 |

(Continued)

FOREIGN PATENT DOCUMENTS

| CN | 1033173 A | 5/1989 |
| CN | 2765808 Y | 3/2006 |

(Continued)

OTHER PUBLICATIONS

International Search Report, dated Nov. 28, 2017, from corresponding PCT/FR2017/052523 application.
(Continued)

*Primary Examiner* — Derek S. Chapel
*Assistant Examiner* — Adam W Booher
(74) *Attorney, Agent, or Firm* — Nixon & Vanderhye

(57) ABSTRACT

A filtering vision element forming a windshield or rearview mirror of a road vehicle includes a lower region and an upper region. The filtering vision element is designed so that a difference in attenuation between two linear polarizations of an incident radiation has values that are of opposite signs in the lower and upper regions. The two linear polarizations may respectively be horizontal and contained in a vertical plane. Blinding of the driver caused by a spot of reflected light produced on a road by headlights of an external vehicle may thus be decreased or prevented.

20 Claims, 4 Drawing Sheets

(58) Field of Classification Search
CPC ...... G02B 5/30; G02B 5/0816; G02B 5/3016; G02B 27/28; G02B 27/281; B60R 1/00; B60R 1/02; B60R 1/08; B60R 1/083; B60R 1/084; B60R 1/086; B32B 2307/42; F21S 41/135; F21V 9/14
See application file for complete search history.

(56) References Cited

U.S. PATENT DOCUMENTS

2007/0146574 A1    6/2007  Giraudet
2017/0356612 A1*  12/2017  Leon Esquivel .... G02B 27/281

FOREIGN PATENT DOCUMENTS

| | | |
|---|---|---|
| CN | 202782600 U | 3/2013 |
| EP | 1 334 869 A2 | 8/2003 |
| EP | 2 161 123 A1 | 3/2010 |
| FR | 1 556 208 A | 2/1969 |
| GB | 926176 * | 5/1963 |
| GB | 2527627 A | 12/2015 |
| IT | TO910081 A1 | 8/1992 |
| JP | 2011 145331 A | 7/2011 |
| WO | 2006/101712 A2 | 9/2006 |

OTHER PUBLICATIONS

Office Action issued in Chinese Patent Application No. 201780057350.3 dated Mar. 8, 2022.

* cited by examiner

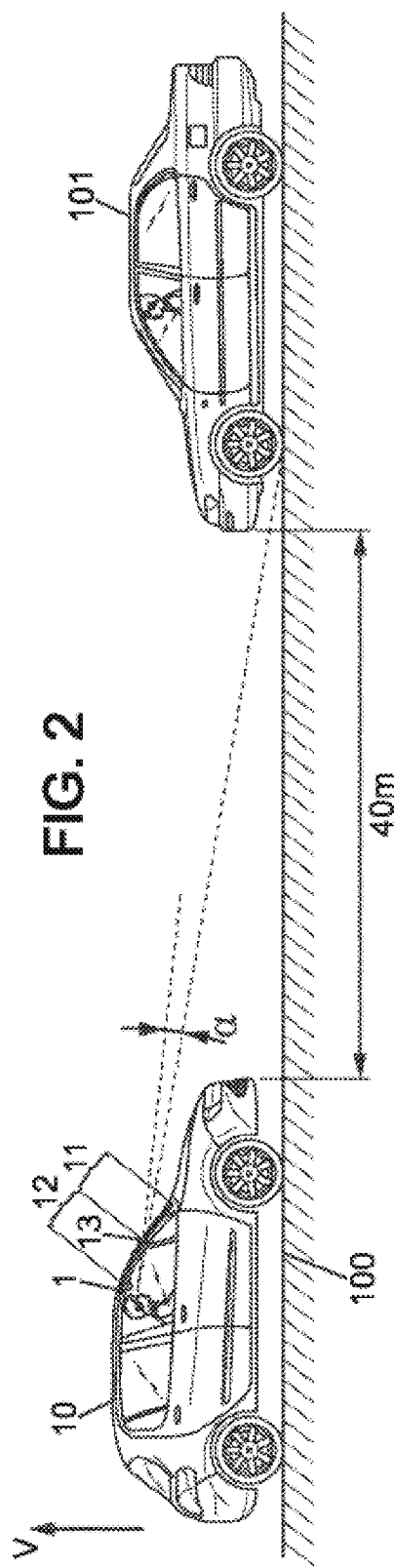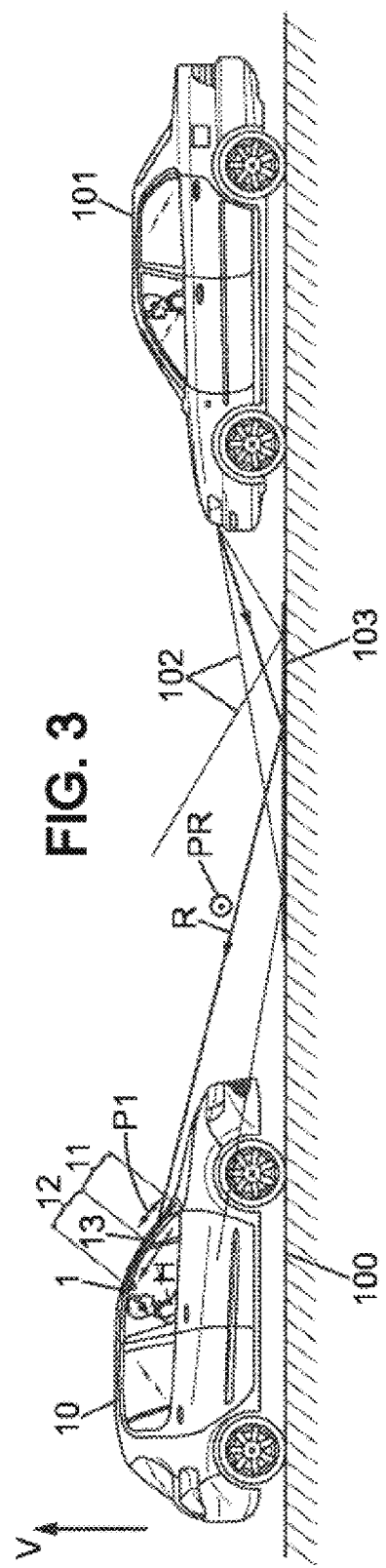

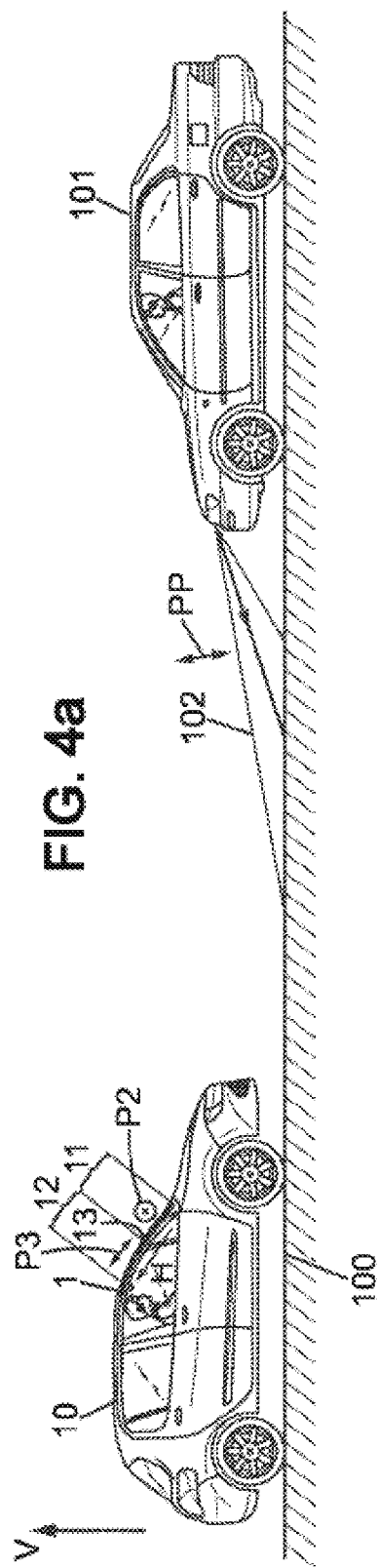
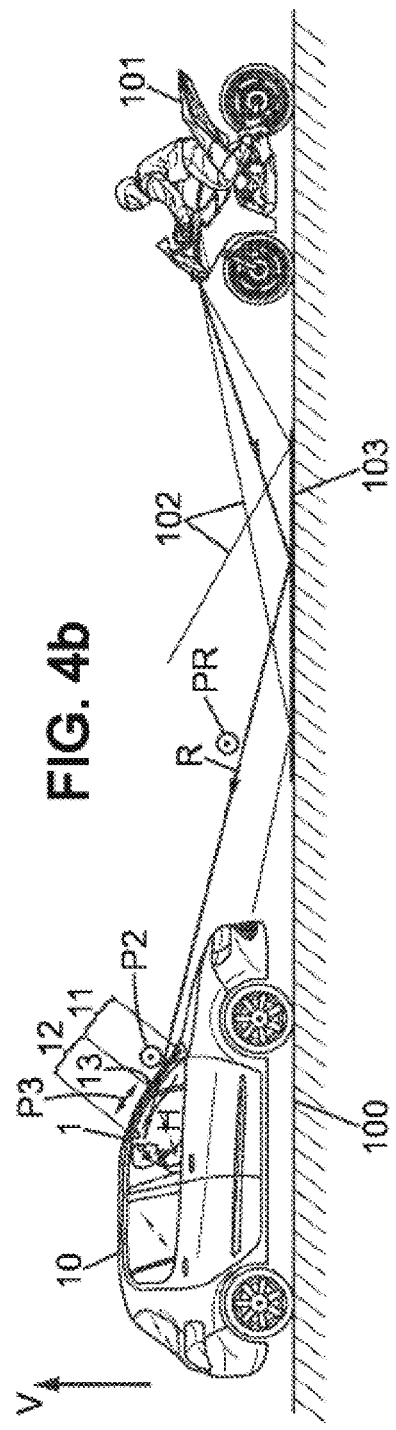

FILTERING VIEWING ELEMENT FORMING A FRONT OR REAR WINDSHIELD OF A ROAD VEHICLE

BACKGROUND OF THE INVENTION

Field of the Invention

The present invention relates to a filtering vision element forming a windscreen or rearview mirror for a road vehicle, as well as a method for improving vision for the vehicle's driver.

Description of the Related Art

It is known, in particular from document WO 2006/101712, to use a filtering vision element to form a windshield or a rearview mirror of a road vehicle on which this element is mounted. The element is then adapted to filter incident radiation that contributes to vision for the vehicle's driver, based on an orientation of the linear polarization of this radiation.

In the present description, the direction of polarization of radiation is the direction in which the electric field of the radiation is directed. In addition, filtering a radiation on the basis of its orientation relative to a fixed filtering direction is understood to mean selecting a component of this radiation for which the direction of polarization is parallel to the filtering direction, with the intention of using it for a visual perception or detection of this component. The complementary component of the radiation for which the direction of polarization is perpendicular to the filtering direction is completely eliminated or is attenuated to a greater extent than that of the selected component.

It is also known that reflection of a radiation by a dioptric or absorbent surface modifies the polarization of this radiation. During reflection, the relative intensity is increased for the radiation component having linear polarization parallel to the reflecting surface, compared to the radiation component having linear polarization contained in a plane perpendicular to the reflecting surface. When the reflecting surface is an interface between two transparent media, the reflection produces a polarization filtering which is total for the Brewster's value of the angle of incidence of the radiation on the surface: the reflected radiation is completely polarized parallel to the reflecting surface. This polarization effect still exists, although to a lesser but still significant extent, when the reflecting surface is also absorbing, and when the angle of incidence of the radiation is different from the Brewster's angle.

For these reasons, light produced by the headlights or signalling lights of a vehicle, and that is reflected on the surface of a road or pavement, is mainly polarized linearly and horizontally. In addition, this light reflected by the road is more intense when the road is wet.

In practice, the angle of elevation of the illumination from headlights of vehicles traveling on a road is adjusted to prevent this light from directly shining into the eyes of a driver of another vehicle. The driver is then not blinded by the direct light emitted by the headlights of other vehicles. But the portion of the light that is emitted towards the road surface and is reflected towards the drivers eyes by this surface, may blind or bother the driver, particularly during night driving conditions and in rainy weather. This blinding or visual annoyance is even more significant when the roughness of the road causes the reflective spot perceived by the driver to spread.

BRIEF SUMMARY OF THE INVENTION

In these circumstances, an object of the present invention is to improve vision for the driver, particularly concerning his or her vision comfort, and to reduce the risk of blinding. In general, the invention aims to improve driving safety as related to vision of the driver.

To achieve this or other objects, the present invention provides a novel filtering vision element which forms a windshield or rearview mirror for a road vehicle on which the element is mounted. This element is adapted in at least a portion of its vision surface, called filtering portion, to transmit or reflect towards a vehicle's driver a radiation which has, outside the vehicle and before reaching the vision surface, a linear polarization parallel to a filtering direction which is fixed relative to the element, with a lower attenuation in comparison to another radiation which has, outside the vehicle, a linear polarization contained in a plane perpendicular to the filtering direction.

According to a first feature of the invention, the vision surface comprises a lower region and an upper region which is located higher than the lower region relative to the vehicle and to a mounting position of the filtering vision element in the vehicle, and the filtering portion referred to above corresponds either to the lower region or to the upper region.

According to a second feature of the invention, the other one among the lower region and upper region, which does not correspond to the filtering portion, is adapted to transmit or reflect towards the driver both radiations which have, outside the vehicle and before reaching the vision surface, linear polarizations respectively parallel to the filtering direction and contained in a plane perpendicular to the filtering direction, so that a difference in attenuation between these linear polarizations has distinct values in the lower and upper regions.

By its ability to filter the radiation differently in the lower and upper regions of the vision surface, the vision element of the invention can improve the vision comfort of the driver in a manner that is optimized differently for each of the regions.

In first embodiments of the invention, the lower region of the vision surface may be adapted to transmit or reflect towards the driver a radiation which has, outside the vehicle and before reaching the vision surface, a horizontal linear polarization with greater attenuation in comparison to a radiation which has, outside the vehicle, a linear polarization contained in a vertical plane. The horizontal and vertical directions are identified relative to the vehicle and to the mounting position of the filtering vision element in this vehicle. The vision element thus attenuates, in its lower region, the light of the headlights of other vehicles that is reflected by the road towards the driver's eyes. Blinding and visual discomfort that this light reflected by the road may cause are thus eliminated or reduced.

In addition, for these first embodiments, the upper region of the vision surface may be adapted to transmit or reflect towards the driver the radiation which has, outside the vehicle and before reaching the vision surface, the horizontal linear polarization with less attenuation in comparison to the radiation which has, outside the vehicle, the linear polarization contained in the vertical plane. It is thus possible to maintain, in the upper region, a vision which is not disturbed or unnecessarily reduced by an attenuation that would be identical to that produced in the lower region.

In second embodiments of the invention, the lower region of the vision surface may be adapted to transmit or reflect towards the driver the radiation which has, outside the vehicle and before reaching the vision surface, the horizontal linear polarization with less attenuation in comparison to the radiation which has, outside the vehicle, the linear polarization contained in the vertical plane. The filtering vision element then enhances the visibility of a first external vehicle whose headlights or signalling lights include a component that is horizontally polarized with respect to a second external vehicle whose headlights or signalling lights are vertically polarized. Indeed, the lower region of the vision surface allows the driver to perceive the light produced by the first vehicle and then reflected on the road, while the road reflects to a lesser extent the light produced by the second vehicle.

In addition, for these second embodiments, the upper region of the vision surface may be adapted to transmit or reflect towards the driver the radiation which has, outside the vehicle and before reaching the vision surface, the horizontal linear polarization with greater attenuation in comparison to the radiation which has, outside the vehicle, the linear polarization contained in the vertical plane. The upper region of the vision surface then also contributes to reinforcing the difference in visual perception between the first and second external vehicles, for the driver.

In general, a filtering vision element according to the invention may comprise at least one linear polarizer that is efficient in one among the lower and upper regions of the vision surface, for producing the value of the difference in attenuation between the linear polarizations for this region.

Also in general, a boundary between the lower and upper regions of the vision surface, or an intermediate region between these upper and lower regions, may be positioned between one-tenth and one-half of a dimension of the vision surface in a vertical plane relative to the vehicle and to the mounting position of the filtering vision element in the vehicle. For this purpose, the one-tenth and one-half of the dimension are measured from a lower edge of the vision surface. Preferably, the boundary between the lower and upper regions or the intermediate region may be located below one-third of the dimension of the vision surface in the vertical plane, from the lower edge.

The invention also provides a method for improving vision for a driver of a road vehicle, wherein the vehicle is equipped with a filtering vision element as described above.

Advantageously, a height or tilt of the filtering vision element may be adjusted, relative to the vehicle and to the mounting position of the filtering vision element in the vehicle, so that a boundary between the upper and lower regions of the vision surface or an intermediate region between the upper and lower regions is superimposed in angle of elevation, for the driver's vision, on an apparent level of contact between a pavement on which the vehicle is located and wheels of an external vehicle also located on the pavement but in front of or behind the vehicle. The difference in angle of elevation may be less than or equal to 10° (degrees) in absolute value, preferably less than 5°, when both vehicles are 40 m (meters) apart from each other.

The method of the invention may be particularly advantageous if it further comprises that vehicles, external to the vehicle in which the filtering vision element is mounted, are equipped with respective lighting and signalling light assemblies that produce light either with linear polarization contained in a vertical plane when the external vehicle is a vehicle with more than two wheels, or with horizontal or natural linear polarization when the external vehicle is a vehicle with two wheels. The external vehicle then appears differently to the driver during night driving conditions depending on whether the external vehicle is a vehicle with two wheels or with more than two wheels. In particular, total light intensity of a two-wheeled vehicle may appear greater for the driver on the vision surface of the filtering vision element.

BRIEF DESCRIPTION OF THE DRAWINGS

Other features and advantages of the invention will be apparent from the following description of some non-limiting exemplifying embodiments, with reference to the accompanying drawings, in which:

FIG. 2 shows relative positions of two road vehicles, one of them being equipped with a filtering vision element in accordance with FIG. 1a;

FIG. 3 illustrates an operation of a first filtering vision element according to the invention;

FIGS. 4a and 4b correspond to FIG. 3 for a second filtering vision element according to the invention.

DETAILED DESCRIPTION OF THE PREFERRED EMBODIMENTS

For clarity, the dimensions of the elements represented in these figures do not correspond to actual dimensions or to actual dimension ratios. Furthermore, identical references indicated in different figures denote identical elements or elements having identical functions.

Figure 1A:
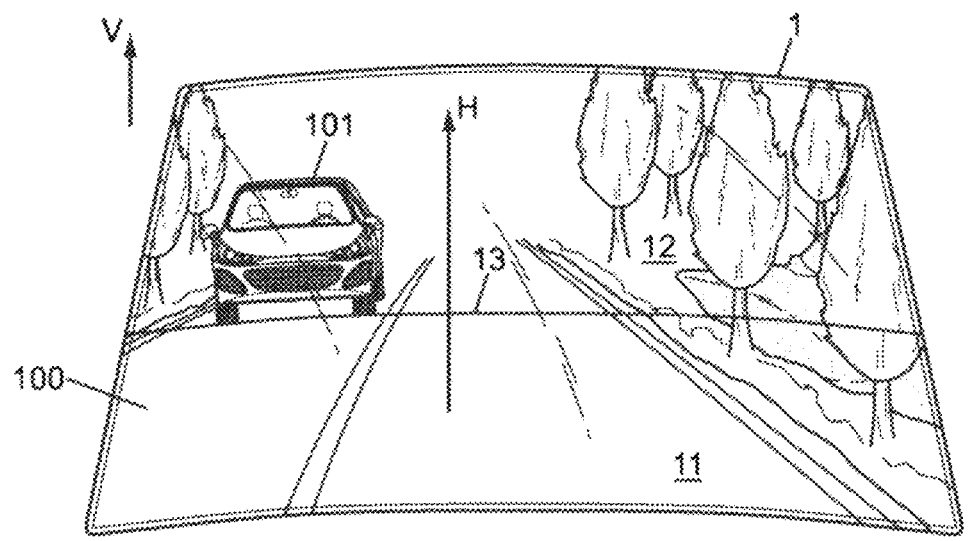
FIGS. 1a and 1b show two filtering vision elements according to the invention.
Figure 1B:
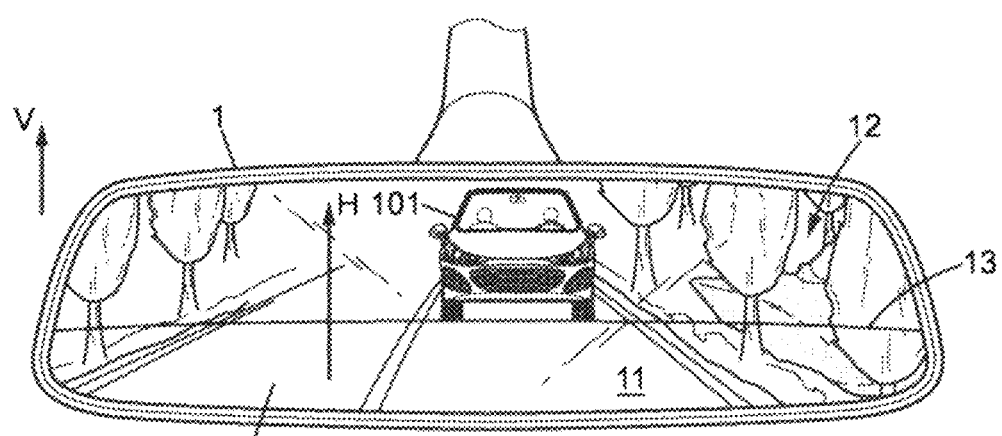

In accordance with FIGS. 1a and 1b, a vision element for a road vehicle, which as a whole is denoted 1, may be a windshield (FIG. 1a) or a rearview mirror (FIG. 1b). Although the shape of the rearview mirror shown in FIG. 1b corresponds to an interior rearview mirror, in other words intended to be mounted in the vehicle inside the passenger compartment, it may alternatively be an external rearview mirror intended to be mounted on the right or left side of the vehicle body. The vision element 1 has a vision surface on which the vehicle driver can look at a portion of the environment external to the vehicle. For the windshield of FIG. 1a, the vision surface generally corresponds to the entire glass sheet, except for portions that are screen-printed or used for attaching the interior rearview mirror. For a rearview mirror, the vision surface generally corresponds to the entire surface of the mirror. In all cases, the vision element has a mounting orientation relative to the vehicle, such that the vertical direction V can be related to the vision element 1. Typically, direction V is perpendicular to the surface 100 of a road being traveled by the vehicle on which the vision element 1 is mounted.

Direction H is a height-wise direction tied to and parallel to the vision element 1: it is defined as the intersection of the vision surface of the element 1 with a plane which is vertically oriented relative to the vehicle. For a normal position of the vehicle on the road, it is directed upward.

In FIGS. 2-5, the reference 10 denotes the vehicle on which the vision element 1 according to the invention is mounted.

For the invention, the vision surface of the element 1 is divided into at least two parts which are superimposed along direction H: a lower region 11 and an upper region 12. The two regions may be adjacent with a common intermediate boundary 13 which is substantially horizontal. Alternatively, an intermediate region (not shown) may be interposed between regions 11 and 12, for example in the form of an intermediate strip which is substantially horizontal.

An height of the boundary 13 is positioned in the vision surface of the element 1 so that it appears for the driver of the vehicle 10 to be substantially at the contact between the road and tires 100 of another vehicle 101 traveling on the same road 100 as vehicle 10. In the case of the windshield (FIG. 1a), this height of the boundary 13 along direction V may be determined for the standard position of the driver as defined by the ISO 4513 standard. For a rearview mirror (FIG. 1b), the apparent height of vehicle 101, located behind vehicle 10, relative to the boundary 13 can be adjusted by changing the tilt of the mirror about a horizontal axis. In general, and as shown in FIG. 2, the boundary 13 is advantageously positioned so as to appear to the driver of vehicle 10 with an angular gap a in a vertical plane which is smaller than 10° (degrees) relative to a line of contact between the tires of vehicle 101 and the road 100 when vehicle 101 is 40 m (meters) in front of or behind vehicle 10. Preferably, the gap a may be less than 5°. Such a position of the boundary 13 may be between one-tenth and one-half of a dimension of the vision surface of the element 1 along the height-wise direction H, measured from the lower edge of the element 1.

According to the invention, both regions 11 and 12 are provided with different polarizing powers. For this purpose, the element 1 may be provided with two polarizing structures, one in each of the regions 11 and 12, so that each region transmits, towards the eyes of the driver of the vehicle 10, a portion of the incident light with a distribution intensity which is modified between two perpendicular linear polarizations. In simple embodiments of the invention, such a polarizing structure may be a polarizing film which covers the concerned region of the vision surface of the element 1. In a known manner, such a polarizing film may be formed from dichroic molecules that are oriented in a predetermined direction, parallel to the film itself. For example, the film may be based on polyvinyl alcohol, or PVA, forming a matrix for dichroic molecules, such as iodine molecules. The film is stretched uniaxially so as to orient the dichroic molecules, and then applied to the vision surface of the element 1 in the desired region, lower 11 or upper 12. The orientation of the film parallel to the vision surface is then defined by the angle between the stretching direction of the polarizing film and the height-wise direction H within the vision surface of the element 1. In the following, the direction of linear polarization of the incident radiation which is transmitted by the element 1 towards the driver's eyes without changing its polarization and with maximum retransmission efficiency is called the direction of polarization of the polarizing structure. The direction of polarization which is thus defined is perpendicular to that of the linear polarization of radiation which is absorbed in a maximum proportion by the polarizing structure, when the polarization of the radiation is itself gradually varied around the direction of propagation. When the element 1 is a windshield, the radiation is retransmitted by transparency, with no significant change in its direction of propagation. Alternatively, when the element 1 is a mirror, the radiation is retransmitted by reflection.

According to FIG. 3, both vehicles 10 and 101 are traveling towards one another on the road 100, for example under night conditions. The headlights of vehicle 101 are on, projecting a beam of light 102 towards the surface of the road 100 in front of vehicle 101. The surface of the road 100 reflects the beam 102, partially towards vehicle 10. The reference R denotes a ray of light inside the beam 102, which is thus reflected towards the eyes of the driver of the vehicle 10. In a known manner, the beam 102 has, after its reflection on the road 100, a linear polarization which is mainly oriented parallel to the road surface. This polarization orientation is symbolized in FIG. 3 by a circle with a dot at its center, and denoted PR. This polarizing effect of the surface of the road 100 corresponds in part to the Brewster's effect. It is accentuated when the road is wet. Because of this reflection, the driver of vehicle 10 perceives a spot of light 103 on the road 100 in front of vehicle 101, which can be blinding. This spot of reflected light 103 is sometimes called a puddle of light. It is even wider on the road 100 when the road surface is rougher or more grainy.

An object of the invention is to eliminate or reduce the blinding of the driver of the vehicle 10 which is thus causes. For this purpose, according to a first embodiment of the invention, the windshield 1 may be provided in its lower region 11 with a polarizing film in which the direction of polarization is parallel to the height-wise direction H, as indicated by the double-headed arrow next to the lower region 11 of the windshield 1 and denoted P1. In this manner, the polarizing film absorbs the portion of the beam 102 that is reflected towards the driver of the vehicle 10, so that the driver no longer sees the puddle of light 103 ahead of the vehicle 101.

Simultaneously, again with reference to FIG. 3, the upper region 12 may be provided with a polarizing film in which the direction of polarization is horizontal, so that both regions 11 and 12 have identical values for the light transmission coefficient of a radiation which is naturally polarized. The boundary 13 is then invisible outside the beam 102. Radiation which is naturally polarized is understood to mean radiation having energy that is distributed equally between two directions of polarization that are perpendicular to each other, in particular an equal distribution of energy between the horizontal polarization and a direction of polarization which is contained in a vertical plane.

FIG. 4a uses again the driving situation of FIG. 3 with both vehicles 10 and 101. Vehicle 10 has a windshield 1 which is according to a second embodiment of the invention.

According to another aspect of the invention, the light produced by the headlights of vehicle 101 is linearly polarized in a vertical plane when the vehicle 101 has more than two wheels, for example when it is a four-wheeled vehicle or a truck with more than four wheels. The double-headed arrow denoted PP in FIG. 4a indicates this polarization. Such a polarization can be produced by polarizers arranged at the output of the optics of the headlights of vehicle 101, or the light may be directly produced with such linear polarization by the light source of the headlights. The beam of the headlights of vehicle 101 is then reflected with zero or low intensity by the surface of the road 100. The driver of vehicle 10 therefore does not see any puddle of light in front of the vehicle 101, or sees a spot of light of low intensity.

FIG. 4b corresponds to FIG. 4a for the case where vehicle 101 has two wheels, in particular a motorcycle. In this case, the light produced by the headlight or headlights of vehicle 101 may be horizontally or naturally polarized. In both cases, the light of the beam 102 from the motorcycle is horizontally polarized after reflection on the surface of the road 100, as in the situation of FIG. 3.

For the second embodiment of the invention, the lower region 11 of the windshield 1 of vehicle 10 may be provided with a polarizing film in which the direction of polarization is horizontal. P2 denotes the symbol of the horizontal direction of polarization of the polarizer integrated into the lower region 11 of the windshield 1. The driver of vehicle 10 then does not perceive a puddle of light when the vehicle 101 is of the type having more than two wheels (FIG. 4a), but perceives the puddle of light 103 when the vehicle 101 has two wheels (FIG. 4b). His or her visual attention is therefore drawn more strongly in the latter case.

Simultaneously, again with reference to FIGS. 4a and 4b, the upper region 12 may be provided with a polarizing film in which the direction of polarization is parallel to the height-wise direction H. This direction of polarization is denoted P3. In this manner, the boundary 13 between regions 11 and 12 may again be invisible for objects external to the vehicle 10 that emit or reflect light which is naturally polarized in the direction of the driver's eyes.

Figure 5:
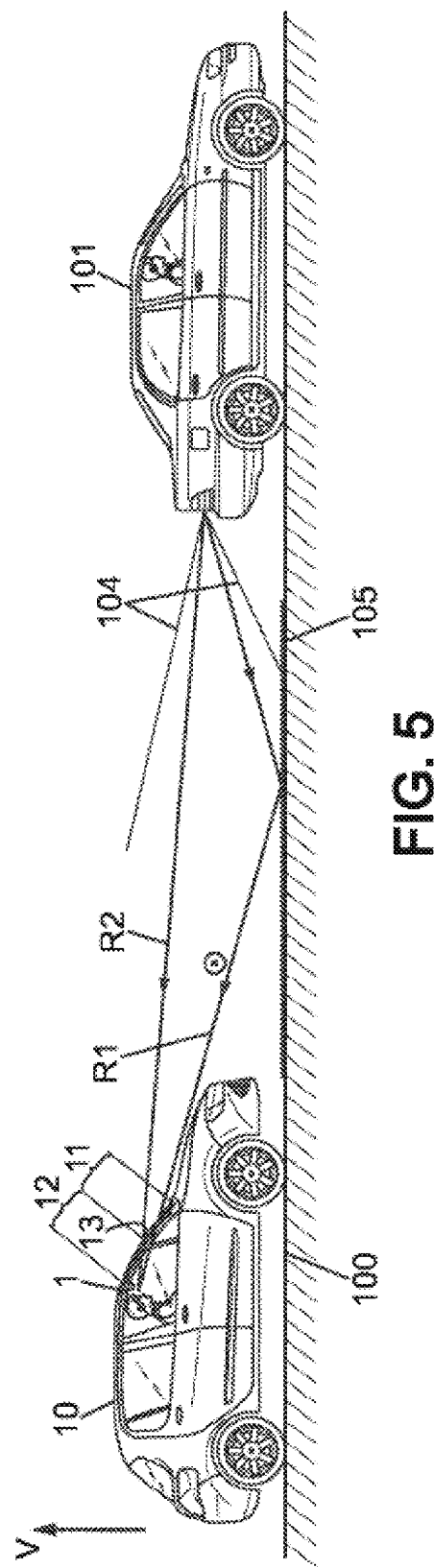
FIG. 5 illustrates a further advantage of a filtering vision element according to the invention.

FIG. 5 illustrates a situation in which both vehicles 10 and 101 are traveling in the same direction on the road 100, vehicle 101 in front of vehicle 10. The signalling lights positioned at the rear of vehicle 101, in particular its braking signal lights commonly called brake lights, produce a beam of light 104. This beam 104 contains light rays which reach the eyes of the driver 10 after reflection on the surface of the road 100, but also light rays that reach the driver's eyes directly. References R1 and R2 respectively denote these two types of light rays. If the light produced by the rear signal lights of the vehicle 101 is naturally or horizontally polarized, the driver of vehicle 10 perceives the light as follows:

for the first embodiment (FIG. 3): the driver of vehicle 10 only perceives the direct light (ray R2) through the upper region 12 of the windshield 1, without seeing the puddle of light 105;

for the second embodiment (FIGS. 4a and 4b): the driver of vehicle 10 sees the puddle of light 105 through the lower portion 11 of the windshield 1 (ray R1), and does perceive the direct light through the upper region 12 only if the beam 104 is produced with natural polarization.

Although both embodiments of the invention have been described for the case of a vision element forming a windshield, with reference to FIGS. 2, 3, and 4a, 4b, the skilled person understands that the invention applies identically to a rearview mirror inside or outside the vehicle 10. The detailed descriptions of some embodiments which were provided above can then be easily transposed to situations where vehicle 101 is following vehicle 10 on the road 100.

Finally, it is understood that details of implementation of the invention can be adapted or modified from the above descriptions, while at least partially maintaining some of the benefits that have been cited. In particular.

each polarizing structure which is used may have a composition that differs from a simple linearly polarizing film; and each polarizing structure may be only partially efficient in eliminating radiation whose direction of linear polarization, outside the vehicle, is perpendicular to the direction of polarization of the polarizing structure itself. In other words, the intensity of the radiation which is polarized perpendicularly to the direction of polarization of the polarizing structure, may be reduced without being completely canceled. The filtering vision element is then again in accordance with the invention.

The invention claimed is:

1. A filtering vision element forming a windshield or rearview mirror for a road vehicle on which the element is mounted, at least a filtering portion of a vision surface of the element being configured to transmit or reflect a radiation towards a driver of the vehicle, the radiation having, outside the vehicle and before reaching the vision surface, a linear polarization parallel to a filtering direction which is fixed relative to the vehicle, with a lower attenuation compared to another radiation having, outside the vehicle, a linear polarization contained in a plane perpendicular to the filtering direction, the vision surface including a lower region and an upper region which is located higher than the lower region relative to the vehicle and a mounting position of the filtering vision element in said vehicle, said filtering portion corresponding to one of the lower region and the upper region, the other one of the lower region and the upper region, which does not correspond to said filtering portion, being configured to transmit or reflect towards the driver both radiations having, outside the vehicle, the linear polarizations respectively parallel to the filtering direction and contained in the plane perpendicular to said filtering direction, so that a difference in attenuation between said linear polarizations has distinct values in the lower region and the upper region, wherein the lower region of the vision surface is configured to transmit or reflect towards the driver a radiation having, outside the vehicle and before reaching the vision surface, a horizontal linear polarization with greater attenuation compared to a radiation having, outside the vehicle, a linear polarization contained in a vertical plane relative to the vehicle and the mounting position of the filtering vision element in said vehicle, wherein the upper region of the vision surface is configured to transmit or reflect towards the driver the radiation having, outside the vehicle and before reaching the vision surface, the horizontal linear polarization with less attenuation compared to the radiation having, outside the vehicle, the linear polarization contained in the vertical plane, and wherein the upper region and the lower region each comprise a respective polarizing film.

2. The filtering vision element according to claim 1, wherein the respective polarizing films are each efficient in a respective one of the lower region and the upper region of the vision surface, to produce the value of the difference in attenuation between the linear polarizations for said respective lower region or the respective upper region.

3. The filtering vision element according to claim 2, wherein a boundary between the lower region and the upper region of the vision surface, or an intermediate region between said upper region and the lower region, is positioned between one-tenth and one-half of a dimension of said vision surface in a vertical plane relative to the vehicle and the mounting position of the filtering vision element in said vehicle, the one-tenth and one-half of the dimension being measured from a lower edge of the vision surface.

4. A method for improving vision for a driver of a road vehicle, wherein the vehicle is equipped with the filtering vision element according to claim 3.

5. A method for improving vision for a driver of a road vehicle, wherein the vehicle is equipped with the filtering vision element according to claim 2.

6. The method according to claim 5, wherein vehicles, external to the vehicle in which the filtering vision member is mounted, are equipped with respective lighting and signalling light assemblies that produce light either with linear polarization contained in a vertical plane when said external vehicle is a vehicle with more than two wheels or with horizontal or natural linear polarization when said external vehicle is a vehicle with two wheels.

7. The filtering vision element according to claim 1, wherein a boundary between the lower region and the upper region of the vision surface, or an intermediate region between said upper region and the lower region, is positioned between one-tenth and one-half of a dimension of said vision surface in a vertical plane relative to the vehicle and the mounting position of the filtering vision element in said vehicle, the one-tenth and one-half of the dimension being measured from a lower edge of the vision surface.

8. A method for improving vision for a driver of a road vehicle, wherein the vehicle is equipped with the filtering vision element according to claim 7.

9. A method for improving vision for a driver of a road vehicle, wherein the vehicle is equipped with the filtering vision element according to claim 1.

10. The method according to claim 9, wherein a height or tilt of the filtering vision element is adjusted, relative to the vehicle and the mounting position of the filtering vision element in said vehicle, so that a boundary between the lower region and the upper region of the vision surface or an intermediate region between said lower and upper regions is superimposed in angle of elevation, for the driver's vision, on an apparent level of contact between a pavement on which the vehicle is located and wheels of an external vehicle also located on the pavement but in front of or behind the vehicle, with a difference in angle of elevation that is less than or equal to 10° in absolute value, when said vehicle and said external vehicle are 40 m apart from each other.

11. The method according to claim 10, wherein vehicles, external to the vehicle in which the filtering vision member is mounted, are equipped with respective lighting and signalling light assemblies that produce light either with linear polarization contained in a vertical plane when said external vehicle is a vehicle with more than two wheels or with horizontal or natural linear polarization when said external vehicle is a vehicle with two wheels.

12. The method according to claim 9, wherein vehicles, external to the vehicle in which the filtering vision member is mounted, are equipped with respective lighting and signalling light assemblies that produce light either with linear polarization contained in a vertical plane when said external vehicle is a vehicle with more than two wheels or with horizontal or natural linear polarization when said external vehicle is a vehicle with two wheels.

13. A filtering vision element forming a windshield or rearview mirror for a road vehicle on which the element is mounted, at least a filtering portion of a vision surface of the element being configured to transmit or reflect a radiation towards a driver of the vehicle, the radiation having, outside the vehicle and before reaching the vision surface, a linear polarization parallel to a filtering direction which is fixed relative to the vehicle, with a lower attenuation compared to another radiation having, outside the vehicle, a linear polarization contained in a plane perpendicular to the filtering direction,
  the vision surface including a lower region and an upper region which is located higher than the lower region relative to the vehicle and a mounting position of the filtering vision element in said vehicle, said filtering portion corresponding to one of the lower region and the upper region,
  the other one of the lower region and the upper region, which does not correspond to said filtering portion, being configured to transmit or reflect towards the driver both radiations having, outside the vehicle, the linear polarizations respectively parallel to the filtering direction and contained in the plane perpendicular to said filtering direction, so that a difference in attenuation between said linear polarizations has distinct values in the lower region and the upper region,
  wherein the lower region of the vision surface is configured to transmit or reflect towards the driver a radiation having, outside the vehicle and before reaching the vision surface, a horizontal linear polarization with less attenuation compared to a radiation having, outside the vehicle, a linear polarization contained in a vertical plane relative to the vehicle and the mounting position of the filtering vision element in said vehicle,
  wherein the upper region of said vision surface is configured to transmit or reflect towards the driver the radiation having, outside the vehicle and before reaching the vision surface, the horizontal linear polarization with greater attenuation compared to the radiation having, outside the vehicle, the linear polarization contained in the vertical plane, and
  wherein the upper region and the lower region each comprise a respective polarizing film.

14. The filtering vision element according to claim 13, wherein the respective polarizing films are each efficient in a respective one of the lower region and the upper region of the vision surface, to produce the value of the difference in attenuation between the linear polarizations for said respective lower region or the respective upper region.

15. The filtering vision element according to claim 14, wherein a boundary between the lower region and the upper region of the vision surface, or an intermediate region between said upper region and the lower region, is positioned between one-tenth and one-half of a dimension of said vision surface in a vertical plane relative to the vehicle and the mounting position of the filtering vision element in said vehicle, the one-tenth and one-half of the dimension being measured from a lower edge of the vision surface.

16. A method for improving vision for a driver of a road vehicle, wherein the vehicle is equipped with the filtering vision element according to claim 14.

17. The filtering vision element according to claim 13, wherein a boundary between the lower region and the upper region of the vision surface, or an intermediate region between said upper region and the lower region, is positioned between one-tenth and one-half of a dimension of said vision surface in a vertical plane relative to the vehicle and the mounting position of the filtering vision element in said vehicle, the one-tenth and one-half of the dimension being measured from a lower edge of the vision surface.

18. A method for improving vision for a driver of a road vehicle, wherein the vehicle is equipped with the filtering vision element according to claim 17.

19. A method for improving vision for a driver of a road vehicle, wherein the vehicle is equipped with the filtering vision element according to claim 13.

20. The method according to claim 19, wherein vehicles, external to the vehicle in which the filtering vision member is mounted, are equipped with respective lighting and signalling light assemblies that produce light either with linear polarization contained in a vertical plane when said external vehicle is a vehicle with more than two wheels or with horizontal or natural linear polarization when said external vehicle is a vehicle with two wheels.

* * * * *